3,093,595
CATIONIC ASPHALT-IN-WATER EMULSION
Dale F. Levy and Duane W. Gagle, Bartlesville, Okla., assignors to Phillips Petroleum Company, a corporation of Delaware
No Drawing. Filed Mar. 30, 1961, Ser. No. 99,382
3 Claims. (Cl. 252—311.5)

This invention relates to a cationic asphalt emulsion. In another aspect it relates to improving the performance of a cationic asphalt emulsion by the use of sulfamic acid to form the acid addition product of a cation surface active agent which serves as the emulsifier.

Asphalt, in the form of a water emulsion is finding growing utilization in road building since it can be applied at ordinary temperatures, rather than at the elevated temperatures required for the older molten state of application, or over the expensive method of cutting back with the hydrocarbon solvent to facilitate the asphalt handling. Cationic emulsifiers, in particular, are more versatile, as compared to anionic emulsifiers, since they result in an asphalt emulsion that can be worked satisfactorily with a broader range of aggregates, including the silica type. The probable reason for their superiority is that most aggregate surfaces carry a negative charge, and cationic emulsions are readily attracted and bound to these surfaces.

The combination of a small percentage of a mineral acid or simple organic acid with the surface-active compound forming an acid addition product or salt is known to aid in forming a well-dispersed emulsion. Of great importance regarding the use of such an emulsion in road building is the degree and performance of its adherence to the mineral aggregate.

We have discovered that when sulfamic acid is employed in making the acid addition product from the cation-surface-active compound, the resulting water solubilized emulsifier, in turn, produces a highly cationic, asphalt emulsion which promotes superior adhesion of the asphalt to mineral aggregates, and the like, to a superior degree.

Not only is an excellent road surface formed, but this novel asphalt emulsion is useful in the manufacture of laminated material, composite boards, and other asphalt compounded materials.

It is, therefore, an object of this invention to provide a novel asphalt-in-water emulsion of improved adhesiveness to mineral aggregates. It is another object to provide an asphalt emulsion which can be worked with a broader range of aggregates in road building. It is a still further object to provide a novel acid additive for a cation-surface-active agent yielding an asphalt emulsifier that facilitates the formation of a stable cationic, asphalt-in-water emulsion.

Other objects, advantages and features of the invention should become apparent from the following detailed description.

To accomplish the objects of our invention, there is provided, for example, a cationic asphalt emulsion comprising: 65 parts by weight of asphalt; and 34.4 parts of relatively pure water. An asphalt-in-water emulsion was formed of these components by the use of an emulsifier further comprising 0.5 weight percent of the emulsion, the emulsion being the sulfamic acid addition product of a cationic, surface-active agent, specifically tallow diamine sulfamic acid. The amount of acid used will be in a weight ratio of approximately 1:2 to the organic surfactant. The formation of the emulsion in the colloid mill was promoted by the addition of about 0.1 weight percent calcium chloride, although a number of common metallic salts will serve almost as well as an emulsion promoter. These promoters are selected from the calcium, sodium, aluminum, magnesium and lead salts of hydrochloric, nitric and sulfuric acids. Particularly useful are sodium ammonium, and aluminum chloride, lead nitrate, and aluminum sulfate.

The asphalt employed in this invention can be any asphalt which has been determined by methods well known to those skilled in the art as being suitable for road paving. It has been found that asphalts, having a penetration at 25° C. of from 60 to 300 are suitable for forming the emulsion employed in this invention. For the penetration range described above, heating at about 250° to 300° provides a hot liquid asphalt suited to be fed to a colloid mill for the combination and emulsification therein. The asphalt content of the final emulsion ranges from between 60 and 70 parts by weight.

The formation of an asphalt-in-water emulsion is made possible by the use of an acid addition product of a cation-surface-active compound as an emulsifying agent. The role of surface-active compound in diminishing the surface tension of water when present in small amounts is well known in the art. Among the cation-active organic compounds found particularly suitable to make the addition product that comprises the emulsifier are the N-alkyl trimethylene diamines, derived from coconut, soya and tallow fatty acids, such as are marketed as the Duomeens by Armour and Company. These fatty acid diamines have the general formula $RNH(CH_2)_n-NH_2$ wherein R is a fatty acid radical selected from the group consisting of saturated and unsaturated aliphatic acids ranging from 12 to 20 carbon atoms in chain length, and in ranges from 1 to 3. Particularly useful as a surfactant for forming the asphalt emulsifier is Duomeen T, the tallow diamine.

A group of cationic surface active agents useful for forming the asphalt emulsifiers are the imidazolines having the structural formula:

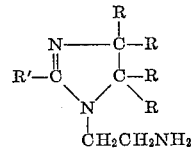

wherein the R's are selected from the group consisting of hydrogen and alkyl groups having 1 to 4 carbon atoms, and the R' is an aliphatic radical selected from the group consisting of saturated monoolefinic and diolefinic groups having from 12 to 20 carbon atoms.

Examples of such surfactants are:

1 - (2 - aminoethyl) - 2 - n - tetradecenyl - 4,5 - dibutyl-2-imidazoline;
1 - (2 - aminoethyl) - 2 - tert - hexadecadienyl - 4,5-dimethyl-2-imidazoline;
1 - (2 - aminoethyl) - 2 - octadecyl - 4 - ethyl - 2 imidazoline;
1 - (2 - aminoethyl) - 2 - sec - eicosyl - 2 - imidazoline;
1 - (2 - aminoethyl) - 2 - tert - dodecyl - 2 - imidazoline;
1 - (2 - aminoethyl) - 2 - n - heptadecenyl - 2 - imidazoline; and
1 - (2 - aminoethyl) - 2 - n - heptadecadienyl - 2 - imidazoline.

Particularly useful as a reactant among the imidazoline is Nalcamine G-39M, marketed by the Nalco Chemical Company, the active ingredient which is a mixture of the heptadecenyl and heptadecadienyl substituted imidazoline of the formula shown above.

These organic surfactants should be used in concentration of at least 0.2 weight percent, based on the emulsion, to assure satisfactory emulsification, ranging up to about 1.0 percent, depending upon the type of emulsion made. A preferable range is about 0.2 percent to 0.5 percent, which will assure proper emulsification, while providing for proper economy in the use of the surfactant.

The combination of a small percentage of sulfamic acid with one of the above-described surfactants gives an addition product that comprises a superior emulsifying agent. In fact, it has been found that a strongly cationic asphalt emulsion simply cannot be formed from use of the surfactant alone. The amount of the acid used is in a weight ratio of approximately 1:2 to the organic surfactant, or about 0.1 to 0.25 weight percent. The acid addition product which serves as the asphalt emulsifying agent has the formula $RNH(CH_2)_n—NH_2 \cdot 2HOSO_2NH_2$.

It has been found that the presence of a small amount of a metallic salt, such as calcium chloride, results in an emulsion of acceptable quality and stability. The exact mechanism by which this is achieved is not known, but the emulsion forms more readily, and the viscosity thereof is regulatable by varying the concentration of the metallic salt. From about 0.1 to 0.25 weight percent of this emulsion "promoter," based on the emulsion, yields a stable emulsion having a viscosity suitable for injection into a formation.

The aqueous phase is conveniently ordinary water, such as would be supplied commercially. However, a low solids content water is preferable. Water from an underground formation, such as an aquifier, which is relatively solids free, is also suitable. The continuous water phase will range from 39 to 29 parts by weight of the final emulsion.

The ingredients of the asphalt emulsion can be admixed in almost any order, and a useful emulsion will result. A superior composition will be produced, however, if a certain procedure is followed. The asphalt emulsion is preferably prepared in the following manner.

The sulfamic acid is dissolved in the water phase. Next, the surfactant is dissolved in the acid solution. Finally, the metallic salt is dispersed in the solution, which is then heated in the range 100–140° F. Separately, the asphalt is heated in the range 250–300° F. to give a hot liquid asphalt. The aqueous solution and the hot asphalt are proportioned to a colloid mill to emulsify the same. The resulting emulsion is then cooled below 150° F., before being transferred to a storage vessel.

*Example*

The superiority of the asphalt emulsion prepared according to this invention was determined in terms of its improved adhesion to mineral aggregates, by comparative tests with asphalt emulsions made according to prior art acid additives. Two conditions of the aggregates were employed, namely, dry and wetted. The emulsion was prepared according to the aforedescribed method. The exact emulsion composition employed in these tests is that given on column 1 of the specification.

The procedure in the dry test was as follows: 100 grams of dry aggregate were coated with 5.5 grams of the asphalt emulsion which were mixed thoroughly for two minutes. The admixture was cured for two hours at 140° F. The cured admixture was again mixed thoroughly and transferred to a 600 ml. glass beaker, then was covered immediately with 400 ml. of distilled water at 77° F. for 16 hours. The specimen was then visually examined (using a 75 watt bulb for lighting), to determine the percentage coverage of aggregate by the asphalt emulsion.

The procedure in the wet test was as follows: 100 grams of dry aggregate were wetted with 2 ml. of distilled water with thorough mixing. To this wet aggregate were added 5.5 grams of the asphalt emulsion, with thorough mixing for 4 minutes. The admixture was placed into a 600 ml. glass beaker, and covered with 400 ml. of distilled water at 77° F. The same visual inspection was made after 16 hours as described in the dry test.

Each of these two tests was performed with 3 emulsions, made up with sulfamic, hydrochloric, and acetic acid, respectively. The amounts of acid and surfactant used in each emulsion were identical. Visual inspection of the percentage of coverage of the aggregate by the several asphalt emulsions was as follows:

| Acid component of emulsifier | Dry test, percent [1] | Wet test, percent [1] |
|---|---|---|
| Sulfamic acid | 100 | 100 |
| Hydrochloric acid | 95 | 95 |
| Acetic acid | 95 | 95 |

[1] About.

It is apparent that the novel emulsion displayed adhesive properties as high as could be visually observed.

Visual inspection regarding the homogeneity of these emulsions indicated that the emulsion prepared according to this invention had a more uniform particle size than the emulsions prepared with the prior art acids.

Various modifications and alterations of this invention will become apparent to those skilled in the art without departing from the spirit and scope of the invention thereof.

We claim:

1. A cationic asphalt-in-water emulsion consisting essentially of: about 60 to 70 parts by weight of particulate asphalt; about 30 to 40 parts by weight of water; about 0.1 to 0.3 part by weight of a metallic salt selected from the group consisting of the calcium, sodium, aluminum, magnesium, and lead salts of hydrochloric, nitric, and sulfuric acids; about 0.3 to 1.5 parts by weight of a water solubilized emulsifier consisting essentially of an acid addition product of a cation, surface-active agent; said acid addition product comprising a major part of said cation, surface-active agent which is a fatty acid amine having the general formula $RNH—(CH_2)_n—NH_2$, wherein R is a fatty acid radical selected from the group consisting of saturated and unsaturated aliphatic acids ranging from 12 to 20 carbon atoms in chain length, and $n$ ranges from 1 to 3 and a minor part of sulfamic acid.

2. A cationic asphalt-in-water emulsion consisting essentially of: about 60 to 70 parts by weight of particulate asphalt; about 30 to 40 parts by weight of water; about 0.1 to 0.3 part by weight of calcium chloride; about 0.3 to 1.5 parts by weight of a water solubilized emulsifier consisting essentially of an acid addition product of a cation, surface-active agent; said acid addition product comprising a major part of said cation, surface-active agent which is a fatty acid amine having the general formula $$RNH—(CH_2)_n—NH_2$$

wherein R is a fatty acid radical selected from the group consisting of saturated and unsaturated aliphatic acids ranging from 12 to 20 carbon atoms in chain length, and $n$ ranges from 1 to 3, and a minor part of sulfamic acid.

3. A cationic asphalt-in-water emulsion consisting essentially of: about 60 to 70 parts by weight of particulate asphalt; about 30 to 40 parts by weight of water; about 0.1 to 0.3 part by weight of calcium chloride; and about 0.3 to 1.5 parts by weight of a water solubilized emulsifier consisting essentially of tallow diamine sulfamic acid.

References Cited in the file of this patent

UNITED STATES PATENTS

| 2,766,132 | Blair et al. | Oct. 9, 1956 |
| 2,886,458 | Ceintrey | May 12, 1959 |

FOREIGN PATENTS

| 702,818 | Great Britain | Jan. 20, 1954 |